2,760,350

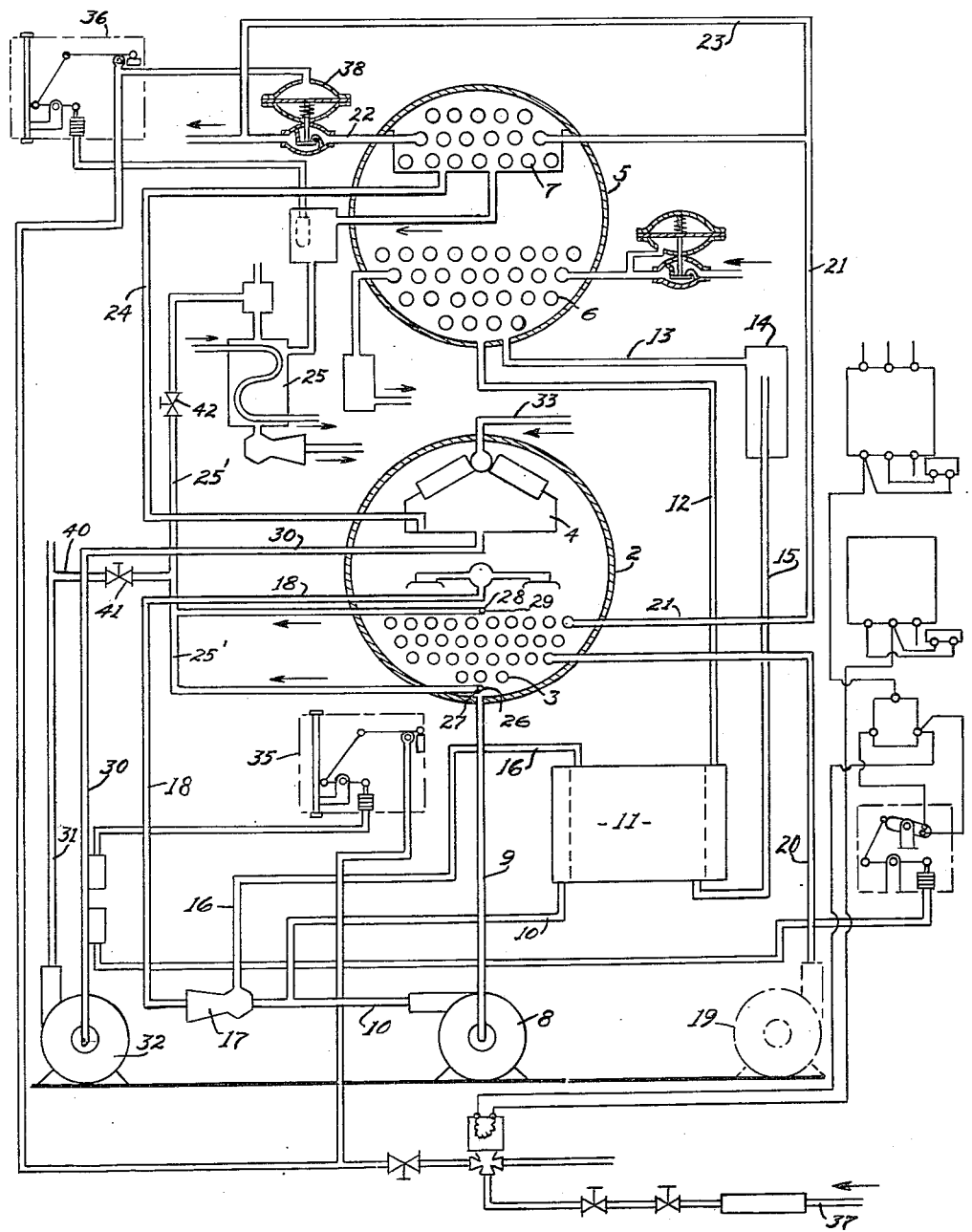

ABSORPTION REFRIGERATION SYSTEMS

Joseph R. Bourne, Syracuse, N. Y., assignor to Carrier Corporation, Syracuse, N. Y., a corporation of Delaware Application April 16, 1953, Serial No. 349,263

7 Claims. (Cl. 62—119)

This invention relates to absorption refrigeration systems, more particularly, to an absorption refrigeration system including simple and ready means for diluting solution in the system upon shut-down and for cleaning the purge line during such dilution.

In absorption refrigeration systems of the type disclosed in Berestneff Patent No. 2,565,943, granted August 28, 1951, it is desirable to dilute solution in the system during shut-down to prevent crystallization of the solution. In addition, it has been found that a purge line in the absorber of the system occasionally becomes dirty or partially clogged thus creating difficulty in purging the absorber during operation of this system.

The chief object of the present invention is to provide an absorption refrigeration system which includes means for diluting solution in the system when operation of the system is discontinued for any reason, thereby preventing crystallization or solidification of this solution during such inactive periods, such means serving to clean the absorber purge line during the addition of the diluent to the solution.

An object of the invention is to provide an absorption refrigeration system including a line connecting a chilled water line with an absorber purge line so that chilled water may be mixed with solution in the system when it is desired to discontinue operation of this system, while at the same time the purge line is washed and cleaned by the passage of the chilled water therethrough. Other objects of the invention will be readily perceived from the following description.

This invention relates to a method of operating an absorption refrigeration system including an evaporator, an absorber, a generator, and a condenser in which the steps consist in utilizing the absorption refrigeration system to cool water, utilizing the cooled water to remove heat from a load, circulating solution between the absorber and the generator, and upon shut-down passing cooled water from the evaporator through a purge line to the absorber while continuing circulation of solution in the system and discontinuing operation of the system.

This invention further relates to an absorption refrigeration system which comprises in combination an absorber, an evaporator, a generator, and a condenser disposed in a closed circuit, means for circulating solution through the circuit, means for circulating cooled water from the evaporator through a line to a load and for returning the water to the evaporator, a line connecting said first line with the absorber, and a valve in said second line to close the same, said valve when in an open position permitting supply of cooled water from the evaporator to the absorber whereby the solution is diluted.

The attached drawing is a diagrammatic view of an absorption refrigeration system including the present invention.

Referring to the attached drawing, there is shown a shell 2 in which is placed a coil 3 which cooperates with the shell to form an absorber. A pan-like member 4 is placed in shell 2 above coil 3 and cooperates with the shell to form an evaporator. A second shell 5 is placed above shell 2; a coil 6 in the lower portion of shell 5 cooperates with shell 5 to form a generator. A second coil 7 placed above generator 6 cooperates with shell 5 to form a condenser. While various combinations of refrigerant and absorbent may be employed it is preferred to employ a solution of water and lithium bromide as the absorbent and water as the refrigerant.

The term "weak solution" is used herein to define a solution weak in absorbing power. The term "strong solution" is used herein to define a solution strong in absorbing power.

Weak solution is drawn from absorber 3 by pump 8 through line 9 and is forwarded to generator 6 through line 10, heat exchanger 11, and line 12. Strong solution is withdrawn from generator 6 through line 13, overflow arrangement 14, line 15, heat exchanger 11, and line 16 to ejector 17 which forwards a mixture of strong and weak solution through line 18 to absorber 3. A portion of the weak solution drawn from absorber 3 by pump 8 is forwarded to ejector 17. The discharge of the weak solution in ejector 17 entrains strong solution from line 16, the mixture being forwarded to absorber 3 through line 18. Overflow arrangement 14 prevents solution in generator 6 rising above or sinking below a predetermined level.

A pump 19 passes cooling water through line 20 to the coil of the absorber 3 and then forwards the water after its passage through absorber through line 21 to the coil of condenser 7, the condensing water leaving condenser 7 through line 22. A bypass 23 may be provided about condenser 7 if desired. A line 24 is used to withdraw refrigerant vapor condensate from condenser 7, the condensate passing to evaporator 4. Line 24 is so selected as to maintain the desired pressure difference between condenser 7 and evaporator 4. A suitable purge arrangement 25 is provided to purge condenser 7 and absorber 3 of non-condensible gases. This purge arrangement includes a purge line 25' connected to line 26 extending longitudinally of absorber 3 having openings 27 therein and a second purge line 28 extending longitudinally of absorber 3 and placed above the coil thereof having openings 29 therein to permit non-condensible gases to be withdrawn from the absorber.

Chilled water provided by the system is withdrawn from evaporator 4 through line 30 and is circulated through line 31 by pump 32 to a place of use such as an air conditioning device (not shown) and is returned to the evaporator 4, through line 33, being flash cooled in the evaporator. The flashed vapor passes downward about member 4, being absorbed by solution in absorber 3 while the chilled water is withdrawn from the evaporator, as described above.

Suitable pneumatic controls designated at 35 and 36 are provided to regulate operation of the system. Compresed air is supplied to the controls through main air-line 37. These controls regulate a valve 38 provided in the condensing water line which regulates flow of condensing water through the absorber and the condenser. The system and the controls therefor are described in Patents Nos. 2,565,943 and 2,565,838 granted August 28, 1951 in the name of Alexis A. Berestneff and in copending application, Serial No. 240,645 filed August 7, 1951 now Patent No. 2,722,805 granted November 8, 1955 in the name of Louis H. Leonard, Jr. Reference is made to such patents and application for a more complete description of the system and its control.

The present invention is concerned primarily with a mechanism permitting chilled water to be mixed with solution in this system to dilute the same when operation of the system is discontinued thereby preventing crystallization of the solution or damage resulting from failure of the controls, electrical failure, failure of the pump and the like and with cleaning the absorber purge line at the same time the solution is diluted.

For this purpose, a line 40 is provided connecting the chilled water line 31 with purge line 25' which connects lines 26, 28 with purge arrangement 25. A valve 41 is placed in line 40. Preferably valve 41 is manually actuated. A second valve 42 is placed in purge line 25'. Line 40 is connected to line 25' at a point between valve 42 and the absorber. When valve 41 is open, pump 32 passes chilled water through line 31 and line 40 to purge line 25'. The water passes from line 25' to lines 26, 28 and is discharged through lines 26, 28 thereby diluting solution in the absorber. At the same time, passage of the chilled water through the purge lines cleans the lines and openings therein.

Considering operation, when it is desired to shut-down the system the condensing water pump 19 is stopped and if desired the steam supply to the generator may be discontinued. Valve 42 is closed and valve 41 in line 40 is opened permitting pump 32 to supply chilled water through line 40 to line 25' and thence to purge lines 26, 28. Such chilled water is discharged through the openings 27, 29 in purge lines 26, 28 and mixes with solution in the absorber to dilute the same. Passage of chilled water through purge line 26, 28, as pointed out above, serves to clean the purge lines. The solution continues to be circulated throughout the system so that mixing of chilled water therewith in the absorber permits the solution to be diluted throughout all portions of the system. After a desired amount of chilled water has been added and mixed with the solution in the absorber to dilute the same, valve 41 is closed. Preferably, circulation of the solution is continued to assure adequate dilution of solution throughout the system. It will be understood, if desired, that circulation of solution throughout the system may be discontinued substantially instantaneously when addition of chilled water to solution in the absorber is discontinued. As pointed out above, however, it is preferred to continue circulation of solution through the system for a short period of time after addition of chilled water to the solution in the absorber is discontinued. Such practice assures that solution in all portions of the system, including the generator, is diluted to prevent crystallization or solidification.

The present invention provides a simple, ready method of diluting solution in the absorption refrigeration machine upon shut-down of the machine. At the same time the method so provided, permits cleaning of the purge line in the absorber regularly so that such purge line is always in operable condition. The dilution arrangement so provided, may be readily installed on existing equipment and is economical in initial cost. The chilled water mixes satisfactorily with the solution by merely continuing circulation of the solution through the system and does not require additional mixing equipment.

While I have described a preferred embodiment of the invention, it will be understood that my invention is not limited thereto since it may be otherwise embodied within the scope of the following claims.

I claim:

1. In a method of operation of an absorption refrigeration system including an evaporator, an absorber, a generator, and a condenser, the steps which consist in utilizing the absorption refrigeration system to cool water, utilizing the cooled water to remove heat from a load, circulating solution between the absorber and the generator and, upon shutdown, forwarding cooled water from the evaporator through a purge line of the system to the absorber to mix with solution in the absorber while continuing circulation of solution in the system and discontinuing operation of this system.

2. In a method of operation of an absorption refrigeration system including an evaporator, an absorber, a generator, and a condenser, the steps which consist in utilizing the absorption refrigeration system to cool water, utilizing the cooled water to remove heat from a load, circulating solution between the absorber and the generator and, upon shut-down, forwarding cooled water from the evaporator through a purge line of the system to the absorber to mix with solution in the absorber while continuing circulation of solution in the system, discontinuing supply of cooled water to the absorber, and discontinuing circulation of solution in the system.

3. In a method of operation of an absorption refrigeration system including an evaporator, an absorber, a generator and a condenser, the steps which consist in utilizing the absorption refrigeration system to cool water, utilizing the cooled water to remove heat from a load, circulating solution between the absorber and the generator and, upon shut-down, cleaning the purge line of the absorber by passing cooled water from the evaporator therethrough while at the same time diluting solution in the absorber.

4. In a method of operation of an absorption refrigeration system including an evaporator, an absorber, a generator and a condenser, the steps which consist in utilizing the absorption refrigeration system to cool water, utilizing the cooled water to remove heat from a load, circulating solution between the absorber and the generator and, upon shut-down, cleaning the purge line in the absorber by forwarding cooled water from the evaporator therethrough while at the same time discharging the cooled water from the purge line in the absorber to mix with solution therein, continuing circulation of solution in the system, and discontinuing operation of the system.

5. In an absorption refrigeration system, the combination of an absorber, an evaportor, a generator and a condenser disposed in a closed circuit, means for circulating solution through the circuit, means for circulating cooled water from the evaporator through a first line to a load and for returning the cooled water to the evaporator, means for purging the system including a purge line in the absorber and means connecting the first line with the purge line to forward cooled water through the purge line to mix with solution in the absorber.

6. In an absorption refrigeration system, the combination of an absorber, an evaporator, a generator and a condenser disposed in a closed circuit, means for circulating solution through the circuit, means for circulating cooled water from the evaporator through a first line to a load and for returning the cooled water to the evaporator, means for purging the system including a purge line in the absorber, a third line connecting the first line with the purge line, and a valve in said third line to close the same, said valve when in an open position permitting supply of cooled water from the evaporator through the purge line to the absorber to dilute solution in the absorber.

7. In an absorption refrigeration system, the combination of an absorber, an evaporator, a generator and a condenser disposed in a closed circuit means for circulating solution through the circuit, means for circulating cooled water from the evaporator through a first line to a load and for returning the cooled water to the evaporator, means for purging the system including a purge line in the absorber, and means for cleaning the purge line in the absorber while simultaneously diluting solution in the absorber.

References Cited in the file of this patent

UNITED STATES PATENTS

| 2,337,439 | Anderson | Dec. 21, 1943 |
| 2,465,904 | McNeely | Mar. 29, 1949 |
| 2,518,202 | Thomas | Aug. 8, 1950 |
| 2,583,722 | Berestneff | Jan. 29, 1952 |
| 2,654,229 | Shagaloff | Oct. 6, 1953 |